United States Patent
Giusti et al.

(10) Patent No.: US 10,161,654 B2
(45) Date of Patent: Dec. 25, 2018

(54) METHOD TO HEAT WATER IN AN ELECTRICAL BOILER, CORRESPONDING DEVICE AND ELECTRICAL BOILER

(71) Applicant: Alpiq Intec AG, Olten (CH)

(72) Inventors: Alessandro Giusti, Bedano (CH); Matteo Salani, Lugano (CH); Andrea Emilio Rizzoli, Vacallo (CH); Luca Maria Gambardella, Tradate (IT); Gian Carlo Dozio, Manno (CH); Fabio Foletti, Manno (CH); Davide Rivola, Bellinzona (CH); Roman Rudel, Massagno (CH); Marco Belliardi, Lugano (CH); Lorenzo Nespoli, Lugano (CH); Vasco Medici, Stabio (CH)

(73) Assignee: INNOSENSE AG, Zurich (CH)

( * ) Notice: Subject to any disclaimer, the term of this patent is extended or adjusted under 35 U.S.C. 154(b) by 0 days.

(21) Appl. No.: 15/506,857

(22) PCT Filed: Aug. 27, 2014

(86) PCT No.: PCT/EP2014/068175
§ 371 (c)(1),
(2) Date: Feb. 27, 2017

(87) PCT Pub. No.: WO2016/029940
PCT Pub. Date: Mar. 3, 2016

(65) Prior Publication Data
US 2017/0276406 A1 Sep. 28, 2017

(51) Int. Cl.
*F24H 9/20* (2006.01)
*G05D 23/19* (2006.01)
(Continued)

(52) U.S. Cl.
CPC .............. *F24H 9/2014* (2013.01); *B60L 3/12* (2013.01); *B60L 11/184* (2013.01);
(Continued)

(58) Field of Classification Search
CPC .......... F24H 9/14; F24H 1/0018; F24H 1/185; F24H 4/04; F24D 19/1054; F24D 17/02;
(Continued)

(56) References Cited

U.S. PATENT DOCUMENTS 5,289,362 A * 2/1994 Liebl .................. G05D 23/1923
700/22
5,363,471 A * 11/1994 Jones ....................... F22B 1/30
219/483
(Continued)

FOREIGN PATENT DOCUMENTS

WO   WO 2012063409 A1 * 5/2012 ......... F24D 19/1039
WO       2013014411 A2    1/2013

OTHER PUBLICATIONS

International Search Report for International Application No. PCT/EP2014/068175 dated Apr. 29, 2015.

*Primary Examiner* — Gregory Huson
*Assistant Examiner* — Daniel E Namay
(74) *Attorney, Agent, or Firm* — Carter, Deluca, Farrell & Schmidt, LLP

(57) ABSTRACT

A method to heat water in an electrical boiler includes storing user's requests of hot water in association with corresponding times of requests, heating water in advance to a next user's request, wherein the next user's request is estimated on the stored user's requests, detecting a start time of a power request from the electrical boiler, detecting a stop time of the power request, determining that a user's request of hot water has occurred if a time difference between the detected stop time and the detected start time is longer than
(Continued)

a predetermined time, the predetermined time being a time of activation of the electrical boiler, storing the determined user's request in association with a time of the user's request, estimating a next user's request based on the stored user's request and activating the electrical boiler to heat water in advance with respect to the estimated next user's request.

16 Claims, 7 Drawing Sheets

(51) Int. Cl.
| | |
|---|---|
| *F24D 19/10* | (2006.01) |
| *B60L 11/18* | (2006.01) |
| *B60L 3/12* | (2006.01) |
| *H02J 3/38* | (2006.01) |
| *H02J 7/02* | (2016.01) |
| *H02J 3/32* | (2006.01) |
| *H02J 7/35* | (2006.01) |
| *F24H 1/18* | (2006.01) |
| *F24D 17/02* | (2006.01) |
| *F24H 1/00* | (2006.01) |
| *H02J 3/00* | (2006.01) |
| *H02J 3/14* | (2006.01) |

(52) U.S. Cl.
CPC ....... *B60L 11/1816* (2013.01); *B60L 11/1842* (2013.01); *B60L 11/1844* (2013.01); *F24D 19/1054* (2013.01); *G05D 23/1923* (2013.01); *H02J 3/32* (2013.01); *H02J 3/383* (2013.01); *H02J 7/02* (2013.01); *H02J 7/35* (2013.01); *B60L 2230/16* (2013.01); *B60L 2240/70* (2013.01); *B60L 2240/80* (2013.01); *B60L 2260/50* (2013.01); *F24H 1/0018* (2013.01); *F24H 1/185* (2013.01); *H02J 2003/007* (2013.01); *H02J 2003/146* (2013.01); *Y02B 70/3275* (2013.01); *Y02E 60/721* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 20/244* (2013.01); *Y04S 30/14* (2013.01)

(58) Field of Classification Search
CPC . F24D 19/10; G05D 23/1923; G05D 23/1951
USPC ............................................ 237/8 A, 2 B, 12
IPC ......... F24H 9/20,1/18, 1/20, 4/04; F24D 17/02
, 15/04, 19/10; G05D 23/19
See application file for complete search history.

(56) References Cited

U.S. PATENT DOCUMENTS

| | | | | |
|---|---|---|---|---|
| 8,204,633 | B2* | 6/2012 | Harbin, III | F24D 19/1051 219/483 |
| 8,862,282 | B2* | 10/2014 | Ohara | F24D 19/1048 700/286 |
| 8,965,584 | B2* | 2/2015 | Deivasigamani | F24D 17/0026 122/1 C |
| 8,972,073 | B2* | 3/2015 | Hayashida | F24D 19/1039 700/286 |
| 8,983,283 | B2* | 3/2015 | Miu | F24H 9/2021 219/483 |
| 9,880,576 | B2* | 1/2018 | McCullough | G05F 1/66 |
| 2001/0009609 | A1* | 7/2001 | Bradenbaugh | F24H 9/2021 392/463 |
| 2008/0135636 | A1* | 6/2008 | Sakai | F24D 11/0214 237/2 B |
| 2009/0211689 | A1* | 8/2009 | Christopher | B29C 35/0294 156/64 |
| 2011/0257795 | A1* | 10/2011 | Narayanamurthy | F24F 5/0046 700/277 |
| 2012/0118989 | A1* | 5/2012 | Buescher | F24H 9/2021 237/8 A |
| 2013/0092103 | A1* | 4/2013 | Strand | G05D 23/1919 122/14.22 |
| 2013/0193221 | A1* | 8/2013 | Buescher | F24H 9/2021 237/8 A |
| 2013/0200168 | A1* | 8/2013 | Buescher | F24H 9/2021 237/8 A |
| 2013/0327313 | A1* | 12/2013 | Arnold | F24H 9/2007 126/344 |
| 2015/0268683 | A1* | 9/2015 | McCullough | H02J 3/00 700/276 |
| 2015/0276265 | A1* | 10/2015 | Davari | H04L 67/025 700/300 |
| 2015/0276268 | A1* | 10/2015 | Hazzard | F24H 9/2035 431/6 |
| 2015/0277463 | A1* | 10/2015 | Hazzard | F24D 19/1063 700/295 |

* cited by examiner

| Current time | 01:00:00 PM |
|---|---|
| Current BSE (boiler stored energy) | 30.00% |

| BSE [% of max BSE] | Average water temperature in boiler |
|---|---|
| 0.00% | 58.0 |
| 10.00% | 58.4 |
| 20.00% | 58.8 |
| 30.00% | 59.2 |
| 40.00% | 59.6 |
| 50.00% | 60.0 |
| 60.00% | 60.4 |
| 70.00% | 60.8 |
| 80.00% | 61.2 |
| 90.00% | 61.6 |
| 100.00% | 62.0 |

FIG. 7A

| Timeslot number | Timeslot start | Timeslot end |
|---|---|---|
| 1 | 01:00:00 PM | 01:15:00 PM |
| 2 | 01:15:00 PM | 01:30:00 PM |
| 3 | 01:30:00 PM | 01:45:00 PM |
| 4 | 01:45:00 PM | 02:00:00 PM |
| 5 | 02:00:00 PM | 02:15:00 PM |
| 6 | 02:15:00 PM | 02:30:00 PM |
| 7 | 02:30:00 PM | 02:45:00 PM |
| 8 | 02:45:00 PM | 03:00:00 PM |
| 9 | 03:00:00 PM | 03:15:00 PM |
| 10 | 03:15:00 PM | 03:30:00 PM |

FIG. 7B

| Timeslot number | Estimated water usage in timeslot [L] | Estimated energy loss [% of BSE] |
|---|---|---|
| 1 | 0 | 0.50% |
| 2 | 0 | 0.50% |
| 3 | 40 | 8.50% |
| 4 | 0 | 0.50% |
| 5 | 0 | 0.50% |
| 6 | 0 | 0.50% |
| 7 | 70 | 14.50% |
| 8 | 0 | 0.50% |
| 9 | 40 | 8.50% |
| 10 | 0 | 0.50% |

FIG. 7C

| Timeslot number | Estimated BSE at end of timeslot | Estimated voltage |
|---|---|---|
| 1 | 29.50% | 230 |
| 2 | 29.00% | 231 |
| 3 | 20.50% | 232 |
| 4 | 70.00% | 233 |
| 5 | 69.50% | 232 |
| 6 | 69.00% | 231 |
| 7 | 54.50% | 230 |
| 8 | 54.00% | 229 |
| 9 | 45.50% | 228 |
| 10 | 45.00% | 227 |

FIG. 7D

| Timeslot number | Scheduled heating power |
|---|---|
| 1 | 0 |
| 2 | 0 |
| 3 | 0 |
| 4 | 5000 |
| 5 | 0 |
| 6 | 0 |
| 7 | 0 |
| 8 | 0 |
| 9 | 0 |
| 10 | 0 |

FIG. 7E

METHOD TO HEAT WATER IN AN ELECTRICAL BOILER, CORRESPONDING DEVICE AND ELECTRICAL BOILER

CROSS REFERENCE TO RELATED APPLICATIONS

This application is a national stage application of International Application No. PCT/EP2014/068175, filed Aug. 27, 2014, the entire contents of which are hereby incorporated by reference herein.

FIELD OF APPLICATION

The present invention relates to a method and device to improve electrical energy demand necessary to heat water in an electrical boiler. More particularly, the invention relates to a method, device and boiler to reduce the cost for heating water in a storage and pre-heating tank of the electrical boiler with energy requested to an electrical grid.

PRIOR ART

A known method to improve a demand of electric energy requested from an electric boiler to an electrical grid includes requesting energy when the temperature of the water in a tank of the boiler is lower than a predetermined lower temperature T1, for instance 18° C., and heating the water to an upper temperature T2, for example 30° C.

The electrical boiler includes the tank, a temperature sensor, heating means associated to the tank and a controller, connected to the sensor and to the heating means, to activate the heating means when a sensed temperature T (for instance 17° C.) is lower than T1(18° C.).

According to the above method, the controller activates the heating means also when no user request for hot water is made.

The principle of such method is that less energy is required to heat water from a temperature between T1 and T2(for instance from 25° C.) to a temperature T3 requested for the usage (for instance to 38° C.), than heating water starting from a temperature T0 lower than the T1(for instance from 15° C.). In other word, the temperature is maintained between Ti and T2, to save cost for heating at temperature T3, when requested by the user.

Activations of the heating means are spread out over the time so that, at each activation, the boiler does not consume much energy.

This method manages the demand for electric energy to at least in part reduce the cost for heating; however, it suffers for some disadvantages, for example because the heating means are activated also when the user does not request hot water for a long period, to maintain the temperature between T1 and T2. For instance, if the user is not at home for the entire day, the heating means consumes energy to unnecessarily maintain water temperature within the predetermined range, for the entire day. At the same time, since the energy demand is spread out in time, energy from the grid is required also when the load is high. Indeed, when the water temperature in the tank is below Ti, the controller activates the heating means, requesting energy from the grid also if the load of the grid is high. Thus, the above method is not adapted to manage the demand of electric energy for reducing the load of the grid or to avoid overloads.

In this respect, another known method addresses the problem of managing the demand of electric energy for avoiding excessive loads on the grid and is based on a central control station, measuring the load of the grid and postponing the supply to some electrical appliances at home.

This method requires a communication between the central control station and the appliance at home, including the electric boilers, for instance an Internet connection, and the setting and definition of electrical appliances whose recharge may be postponed. For instance, the central control station needs some information from the electric boilers to determine whether their supply may be postponed or not. However, not all the boilers may be connected to the Internet or are provided with means or sensors for detecting information to be sent to the control station.

Other known methods do not require an Internet connection on each home appliance but a local connection to a central device at home, to form a sort of LAN among electrical appliances at home. The central device at home manages the electrical appliances and is connected to the Internet, to send information to the grid. However, these methods are not adapted for several boilers, not provided with means to communicate locally in the LAN or outside the home. Moreover, the set up of the central device at home and its connection to the appliances are complicated and expensive. Thus, the known methods are not adapted to optimize the energy demand in both in term of cost for the final user and of load of the grid, especially because it cannot be applied on all the electrical boiler which effectively requests energy from the grid.

The problem at the base of the present invention is that of providing a method and a device to improve energy demand from the electric boiler, which is able to effectively reduce costs for heating water to the users, to reduce the load of the grid or to avoid overloads of the grid, and at the same time being adapted to improve the demand of energy not only from advanced boilers, including sensors and means to detect and communicate their operational status, but also from stand alone electric boilers or boilers with no sensors, thus overcoming the limits that currently prevent an optimization in the supply of electric energy.

SUMMARY OF THE INVENTION

The idea of the solution of the base of the present invention is that of installing an electronic device at the plug of an electric boiler, the electronic device including means to detect information on the boiler and on the grid, for instance the absorption of electrical energy from the boiler for heating water and a load of the grid, and including a memory, for storing the detected information on past heating of hot water at home, and means for scheduling a demand of energy to the grid to heat water in advance to future user request of hot water.

The scheduling of energy is based on the information stored and related to past heating and loads of the grid, and is programmed to satisfy an objective. In an embodiment, the objective is reducing costs for the user; in another embodiment, the objective is reducing loads or avoiding excessive loads of the grid. In a further embodiment, the objective is reducing costs for the user and, at the same time, avoiding excessive loads on the grid.

For instance, water is heated in advance with respect to a next user's estimated request, when the load and the cost of energy are low, and to avoid a further activation of the heating means of the boiler, when the user really request hot water.

In one aspect of the invention, the load of the grid is associated to a value of current measured in the device at the plug of the electrical boiler, for instance a voltage at the plug.

A first voltage V1 is associated to a lower load L1 of the grid with respect to a higher load L2 associated to a second voltage V2 higher than the first voltage V1.

In an aspect of the invention, the device is plugged at the home plug and includes an interface whereto the home boiler is plugged. In another aspect, the boiler is directly plugged at a plug of the home, the device is connected at a different point of the electrical home plant, through which it controls the home boiler. Different configurations are possible, wherein the device forms an interface between the electrical home plant and the home boiler. In any case, according to the invention, the device is locally installed at home.

The value of current, for instance the voltage, may be measured at the plug, if the device is connected to the plug, or at the point where the device is connected to the electrical home plant. In this respect, the device may detect the voltages or other values of current, for estimating the load of the grid, not only when the boiler is activated for heating water but also independently from the boiler, for instance at predetermined intervals of time. In other words, the measures of power absorptions or other information from the boiler are independently controlled with respect to the load of the grid.

The term plug relates to a standard electrical outlet of an home or public electrical plant but the device according to the invention is not limited to a plug connection and is for example connectable to a different point of the electrical plant, for instance to an electrical panel, to a mounting box, to an electrical cable, just to cite some. Moreover, in an embodiment of the invention, the device is integrated in the electrical boiler and it is powered, for example, through a same electrical connection through which the electrical boiler is powered.

On the other hand, the term electrical boiler includes but is not limited to a boiler comprising a resistance as heating means to heat water. Indeed, the electrical boiler may include more complicated systems to heat water, for instance a heat pump. In all the cases, the device and method according to the invention is adapted to detect energy absorbed (from the resistance, from the heating pump or from other heating system of the boiler) and a load of the grid, and includes a memory, for storing the detected information on past heating of hot water, and means for scheduling a demand of energy to the grid to heat water in advance to future user request of hot water.

According to the solution idea mentioned above, the technical problem is solved by a method to heat water in an electrical boiler, as summarized here below.

The method comprises the steps of:
storing a plurality of user's requests of hot water in association with corresponding times of said requests,
heating water in advance to a next user's request,
wherein the next user's request is estimated on the plurality of stored user's requests.

The step of heating in advance is programmed
to reduce a load of an electrical grid or to avoid overloads and/or
to reduce a cost for heating water for satisfying the next user's request.

The load of the grid, associated to the value of current detected locally at home, for instance a voltage at the plug, is stored also in association with a time. Reduction of the load is obtained heating water in advance respect to the hot water supply requested by the user (the estimated request), and more particularly water is heated when the load of the grid is estimated to be low on the base of previously values of load locally measured (detected) at home, and reduction of cost is obtained programming said heating in advance when the cost of energy from the grid is lower. In this last respect, costs of the energy in different time frame are also stored and used to schedule the heating.

According to the applicant's invention the method may be applied to different boilers, on elementary boilers not provided with sensors and/or un-capable of transmitting information and on more sophisticated boilers, for instance including sensor and communication interfaces to send information. In the latter case, the information sensed by the boiler are integrated with the information stored (past and estimated usages), to better program the heating in advance.

More particularly, the method includes the following steps of:
detecting a start time ta of a power request from the boiler to heat water,
detecting a stop time tb of said power request,
associating a user's request at a time between ta and tb if a time difference tb−ta is longer than a time of activation td of the boiler necessary to maintain a temperature of the water in the boiler within a predetermined range Ta-Tb, when water from the tank is not supplied.

Said time of activation td of the boiler necessary to maintain a temperature of the water in the boiler within the predetermined range Ta-Tb is also indicated with the expression "predetermined time difference td", wherein the time difference td is the difference between the start time and the stop time of the boiler to maintain the temperature in said range, when no request of hot water is made from the user.

For instance Ta may be 18° C., Tb 30° C. and the boiler is programmed to activate the heating means if the water in the tank is below 18° C. and to stop heating when the water temperature is 30° C. The time difference td for heating from 18° C. to 30° C., when no user request of hot water is received from the boiler, may be calculated on a plurality of time values ta, tb stored in the past, since time difference td for heating from 18° C. to 30° C. is substantially always the same, for instance 3 minutes. When tb-ta is more than 3 minutes, for instance 7 minutes, the time frame ta-tb is associated to a user request of hot water; in other words, the longer time to heat is associated to a supply of hot water from the tank. A plurality of time frames in a day may be associated to a plurality of user requests, which are stored in a database with corresponding days, months, years, and used to estimate the user's usage (request) of hot water. The user request between the plurality of time frames ta-tb is stored in a memory as past user's requests.

The time difference td may also be used to estimate technical features of the electrical boiler, for instance thermal dispersion or capacity, which are stored and used for scheduling the heating in advance. For instance, the capacity or the thermal dispersion of a boiler A having heating means which are activated for 3 minutes at intervals of 20 minutes may be considered to be less than the capacity or the thermal dispersion of a boiler B having heating means which are activated for 3 minutes at intervals of 30 minutes. The stored and estimated technical features are used to improve optimization of water heating in advance to the next user's request.

In an aspect of the invention, technical features of the boiler, for instance capacity, are estimated comparing the detected activation time td, for instance 20 minutes, with a plurality of reference activation time tr pre-stored, for instance tr1=13 minutes, tr2=20 minutes, tri=23, tr4=32 minutes, tr5=45 minutes, tr6=56 minutes, wherein each reference activation time tr is associated with technical features of a corresponding reference boiler.

Said reference activation time tr of the boiler necessary to maintain a temperature of the water in the reference boiler within a predetermined range is also indicated with the expression "predetermined reference time difference tr", wherein the reference time difference tr is the difference between the start time and the stop time of the reference boiler to maintain the temperature in the range.

For example, the reference time difference tr2=20 minutes is stored with the technical features of a reference boiler C having capacity of 200 liter and thermal resistance TRC.

If the detected time difference td in a boiler A to be controlled by the method of the invention is 20 minutes, i.e. if it corresponds to one of the reference time difference tr2 of the reference boiler C, the capacity of boiler A may be estimated equal to the reference capacity (200 liter) of the reference boiler C and its thermal resistance TRA is estimated to be equal to the reference thermal resistance TRC of the reference boiler C.

In an aspect of the invention, a probabilistic function may be used to estimate the technical features. For instance, if no correspondence between reference time differences tr and detected time difference td is identified, the capacity of the boiler A may be associated through a probability function P to the capacities of more than one reference boilers C, D. Considering the example given above, if the detected time difference of boiler A is 21 minutes, its capacity may be associated to the capacity (200 liter, 20 minutes) of boiler C, with a first probability p1, and to the capacity of boiler D (180 liter, 23 minutes), with a second probability p2. The probability p1 and p2 may differ, for instance higher probability p1 is associated to the capacity of the boiler C having a reference time difference tr2 more proximate to the detected time difference td than the capacity of the boiler D (having a reference time difference tr3 less proximate to td).

The same steps may be applied to estimate further technical features of the boiler, other than the capacity C or thermal resistance TR, given as examples above. Advantageously, according to the method of the invention, even if the boiler is incapable to communicate information, including technical features, its technical features may be estimated, stored and then used, together with the information on the load of the grid and with the cost of energy, to program in advance the heating of water. For instance, water in a boiler with a big capacity and with a good thermal resistance may be heated well in advance the estimated usage, since dispersion of heat is limited; the heating in advance may be sufficient to avoid activation of heating means, when the user request hot water and hot water is supplied.

According to the invention, the start time ta and stop time tb are also used to estimate an energy E stored in the boiler or a temperature T of the water in the boiler at a time t within ta and tb. In this respect, an energy Ea or temperature Ta at time ta are assumed to have a minimum value in a range Ea-Eb (of energy) or Ta-Tb (of temperature), where Eb is the energy at time tb and Tb is the temperature at time tb. Also the estimated values of energies E or temperatures T are stored and used to program the heating of water in advance to the next user's request. Advantageously, a value of energy or temperature stored in the tank of the boiler may be estimated and associated to a time also, when not temperature sensors are available in the tank.

The past user's request of hot water, which is associated to a time between ta and tb as explained above, may be associated to energy Ex absorbed by the boiler from the grid to satisfy the user's request at said time between ta and tb; the energy absorptions Ex are stored in association with corresponding day and time t when energy is absorbed and are used to program the heating in advance.

For instance, if between ta=20.00 and tb=21.00 the energy absorbed is around Ex for all the days of the week, for example because the user generally has a shower at 20.30, the water in the tank may be heated in advance between tx=17.00 and ty=18.00, when the load of the network and/or the cost of the energy are lower than between 19.00 and 20.00 or between 20.00 and 21.00, at a temperature T which, considering the estimated capacity of the boiler and its thermal dispersion, is sufficient to satisfy the user request for the shower at 20.30 (next estimated user's request), if possible without turning on the heating means of the boiler again.

As mentioned above, the method is also adapted to manage boilers including sensors and to integrate the information received from the sensors for better scheduling the heating of the water in advance.

Temperatures T1, Tn of the water at times t1, tn are sensed in the boiler, and stored. Similarly, flows F1, Fn of water through the boiler at times t1, tn are sensed and stored, if a flow meter is available. Flows F1, Fn and/or temperatures T1, Tn are associated to past user's requests, with the corresponding time. In this respect, when a flow meter is available, the past user's request may be determined detecting a flow of water over a predetermined threshold. Similarly, an energy or power absorbed to satisfy the user's request may be determined measuring the temperature of water when the flow starts, measuring the temperature when the flow stop, and integrating these information with the measures of power absorption detected at the plug.

The usage habits of the water can therefore be estimated with more accuracy, because the user request is associated with the amount of water used and/or the temperature set by the user for use. Consequently, the programming of the heating necessary to serve the next user request can be made considering also the quantity and temperature of the water that will be required.

The programming of the heating of water is based on an artificial intelligence module taking in input all the data stored in the past, for instance temperature, flow, power absorption, user's requests and corresponding time, and giving in output commands to the boiler for heating the water in advance with respect to the next estimated user's request.

For instance, if the next usage is estimated at time tnext=19.00, estimated power absorption to serve the next usage is Pest, estimated flow in the next usage is Fnext, estimated temperature of usage is Tnext=38° C., and the cost of the energy and the load of the grid are lower at 17.00 than at 19.00, the boiler mat be heated at 17.00 with more power Padv than Pest. Indeed, supply of more power Padv may be advantageous for the user, because the cost of more Padv at 17.00 may be less the cost of less power at another time (19.00) and because such a supply may be advantageous also for the grid, since its load is low at 17.00 and some energy at 17.00, for instance coming from an excessive availability due to solar panel plants, might be lost at that time, if not immediately used.

Preferably, program in advance is made to satisfy a plurality of next user's requests without turning on the boiler. In a preferred embodiment, the heating in advance is programmed to heat water during night-time and to cover a plurality of next user's requests at day-time.

Also the next user's request is associated to a time, and the time of the next user's request is estimated on the corresponding time of the stored user's requests. The stored user's requests are associated to days of the week and the estimation of the next user's request comprises an estimation of a day of the next user's request based on the corresponding day and time of the stored user's requests.

The method above described is implemented in the device according to the invention and more particularly within a device comprising:

means (M15) to store user's requests of hot water in association with corresponding times of the requests,
means (M4) to program heating of water in advance to a next user's request,
means (M11) to estimate the next user's request on the base of stored user's requests.

The means (M4) to program take in input the user's request and said estimations and gives in output commands to the boiler for reducing a load of an electrical grid and/or for reducing a cost for heating water, at the same time satisfying the next user's request.

The device includes a power sensor, to detect a start time ta of a power request from the boiler and a stop time tb of the power request, and wherein the means to estimate (M11) detect a user's request if a time difference tb–ta between the start time ta and the stop time tb is longer than a predetermined time difference td required to maintain a temperature of the water in the boiler within a predetermined range when water in the boiler is not used.

The device is adapted to be plugged at household power socket and is adapted to be connected to the boiler, including a boiler without sensors.

The device includes means (M12) to estimate technical features of the boiler from the time difference td required to maintain the temperature of the water in the predetermined range, including a storage of the technical features and the means to program (M4) taking in input also the technical features of the boiler.

The device includes means (M10) to estimate an energy stored E in the boiler or a temperature T of the water in the boiler at the time ta and tb, wherein energy Ea or temperature Ta at time ta is a minimum of the energy E or temperature T within a range of energy Ea-Eb or temperature Ta-Tb, where Eb is the energy at time ta and Tb is the temperature at time tb, said means (M10) including a storage of the values of energy E or temperature T estimated and said means to program (M4) takes in input also the stored values E, T.

Further details and embodiments of the method and device according to the present invention are described hereinbelow with reference to the drawings which are given only for exemplification and without limiting the scope of protection of the invention.

BRIEF DESCRIPTION OF THE DRAWINGS

FIGS. 7A-7E include data estimated and stored with the method to heat water in an electrical boiler, according to the present invention.

DETAILED DESCRIPTION OF THE INVENTION

Figure 1:
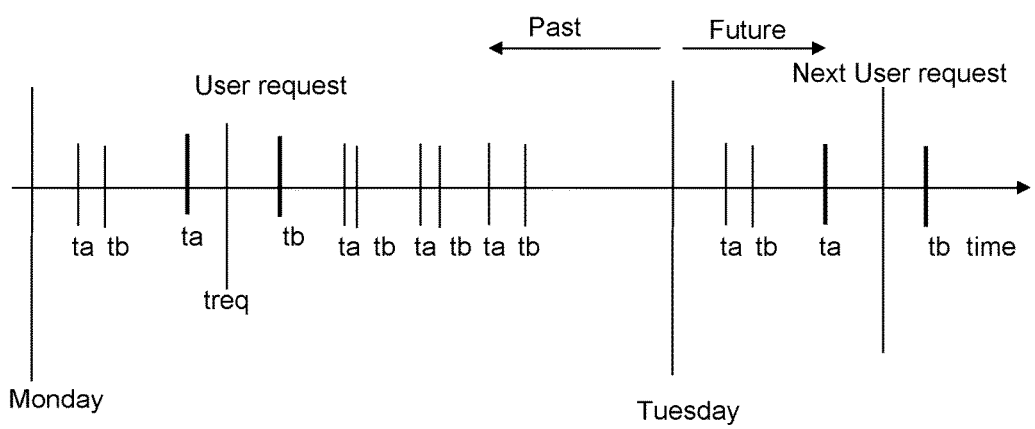
FIG. 1 represents on a time line a past user's request and activation of the boiler to serve the past user's request, and an estimated next user's request, according to the method of the present invention.

With reference to FIGS. 7A-7E, the method to heat water in an electrical boiler according to the present invention is described.

As reported in FIG. 7A, a current time is assumed to be 13:00.

The method at 13.00 programs in advance heating of water in a tank of a boiler for the next n (for instance 10) time steps or time frame, each of which has a predetermined length, for instance 15 minutes, as reported in FIG. 7B. The next user request of hot water is estimated in one or more of the above time frame, for instance frames 3, 7, 9, as represented in Table 3, center column.

In this respect, the next user's request is estimated on a plurality of user's requests in the past, stored in association with corresponding times of said requests. The scope of the method is to reduce a load of an electrical grid and/or to reduce a cost for heating water to satisfying said next user's request, as explained below.

According to an embodiment of the invention, the method estimates energy stored in the boiler (BSE) in said time frames (FIG. 7D), to detect when the heating in advance may be actuated to save costs and/or reduce the load.

In case the boiler is provided at least with a temperature sensor, the estimation of BSE is determined, for example, as a function of an average temperature T of water within the tank, which must always be kept within a given range Ta, Tb, for instance 58° C.-62° C. Therefore, if the average temperature is 58° C., the BSE is assumed to be 0%, whereas if the average temperature is 62° C., the BSE is assumed to be 100%. FIG. 7A reports also the correspondences between temperatures and BESs.

In case no sensors are available, the method advantageously provides a different estimation of BSE.

For instance, in order to detect user's request of hot water, the method detects a start time ta of a power request from the boiler to heat water, detects a stop time tb of the power request, and associates a user's request at a time between ta and tb if a time difference tb–ta is longer than a predetermined time difference td required to maintain a temperature of the water in the boiler within a predetermined range Ta-Tb, when water from the tank is not supplied, i.e. not requested and used by the user.

According to the invention, the start time ta and stop time tb above indicated may advantageously be used also to estimate an energy E stored in the boiler or a temperature T of the water in the boiler at a time t within ta and tb, i.e. in a time frame. In this respect, an energy Ea or temperature Ta at time ta are assumed to have a minimum value (0%) in a range Ea-Eb (of energy) or Ta-Tb (of temperature), where Eb is the energy at time tb and Tb is the temperature at time tb, and where Eb is considered the full energy (100%) or Tb the maximum temperature. Ea and Ta are the minimum values of energy or temperature in the boiler (0%), at time ta.

Thus, a value of energy or temperature (at least in percentage) stored in the tank of the boiler may be estimated and associated to a time, also when no temperature sensors are available in the tank. For instance, with reference to FIG. 3, during time slots 1 and 2 the user is estimated to use no water and in slots 3 to use 40 liter. Thus, in slots 1 and 2 the estimated loss of energy is 0.5%, due to thermal dispersion, and in slot 3 is 8.5%, due to the usage. Accordingly, the boiler stored energy in time slot 1 and 2 is 29,5% and 29% respectively, while at time slot 3, it is estimated to decrease to 20.5%, due to the usage Again with reference to FIG. 7C, right side, for every 15 minutes the boiler is estimated to lose 0.5% of the BSE, corresponding to 0.02 degrees in average temperature, due to thermal dispersion, when no hot water is consumed by the user. This loss of energy is estimated on the base of thermal dispersion of the tank, which may also be estimated as a technical feature of the boiler, as well as other technical features, like the capacity, through information stored according to the method.

For instance capacity or thermal dispersion are estimated comparing the detected time of activation td (time difference td), for instance 20 minutes, with a plurality of reference activation time tr pre-stored, for instance tr1=13 minutes, tr2=20 minutes, tr3=23, tr4=32 minutes, tr5=45 minutes, tr6=56 minutes, wherein each reference activation time tr is associated with technical features of a corresponding reference boiler.

In addition, cold water is mixed when hot water is used. Therefore, there is an additional loss of BSE when hot water is consumed. According to the method, the loss of BSE is estimated on the base of past user's request and corresponding power absorption from the grid.

To measure power absorption from the boiler, preferably, a device according to the present invention is interfaced between the electrical plant and the boiler, for instance at a plug.

Determination of the user request in the device is made for instance:
detecting the start time ta of the power request from the boiler to heat water,
detecting the stop time tb of the power request,
associating the user's request at a time treq between ta and tb if the time difference tb–ta is longer than the predetermined time of activation td required to maintain the temperature of the water in the boiler within a predetermined range Ta-Tb, when water from the tank is not supplied.

In this respect, FIG. 1 represents on a time lime the determination of a next user's request. A plurality of start times ta of power requests from the electrical boiler to heat water are detected in the past, as well as a corresponding plurality of stop times tb of said power requests. A user request in the past is associated to a time t-req between a start time ta and a stop time tb if a time difference tb–ta between stop time tb and start time ta is longer than a time td of activation of the boiler (indicated with a shorted range tb-ta) necessary to maintain a temperature of the water in the boiler within a predetermined range (Ta-Tb) when water in the boiler is not used. The next user's request is for instance estimated at the same time in a following day of the week with respect to the day in which past requests are detected.

In an aspect of the invention, the time of activation td is determined selecting a plurality of time differences tb–ta stored in the past which differ one from the other by less than a predetermined value and associating the time of activation td to said selected plurality of time differences tb–ta. In this respect, a plurality of time differences (start-stop) ta-tb in FIG. 1, shorter than the time difference (start-stop) ta-tb when the user requests water, may be identified. Said plurality of shorter time difference may differ one from the other but are substantially similar and thus are associated to the time of activation td.

In an aspect, the time of activation td is calculated as a medium value of said plurality of shorter time differences tb–ta stored in the past which differ one from the other by less than a predetermined value.

According to the invention, the method determines, at each time step, whether putting energy into the boiler and thus increases the BSE; for instance, as shown in FIG. 7D, energy is provided to the boiler in timeslot 4. Heating at some point (in a time slot) is always scheduled by the method, to avoid a drop of BSE below 0%, i.e. that the average water temperature drops below 58° C., contrary to the given range Ta, Tb (58° C.-62° C.).

FIG. 7D, right side, reports the estimated voltage of the current, which is associated to the load of the grid. To prevent excessive load on the grid, the method schedule heating of water when voltage is high, in timeslot 4, which is the slot with the highest expected voltage. If the initial BSE was lower than reported in FIGS. 7A-7E, the scheduler schedules heating earlier than timeslot 4, to avoid a BSE below 0%.

The method is executed at predetermine intervals, for instance every few minutes, and this frequency of execution is adapt to modify the heating in advance depending on changes, for instance on the load of the grid or unforeseen circumstances (unexpected water usage).

Figure 2:
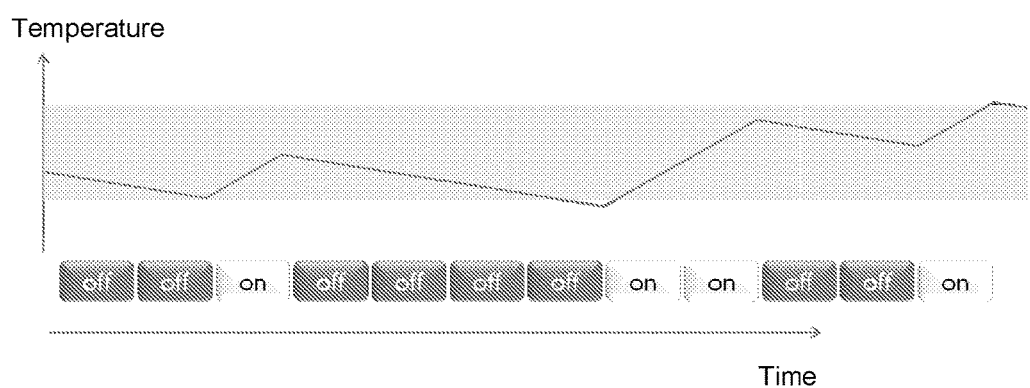
FIG. 2 is a diagram time-temperature of a boiler controlled through the method of the present invention.

FIG. 2 schematically represents the flow of temperature in the boiler as a function of time. In this example, at a certain estimated time ($3^{rd}$ slot) the boiler is activated for less time (one slot) than in another estimated time ($8^{th}$ and $9^{th}$ slots) because at the latter time the load of the grid and/or the cost of electric energy is estimated to be low, and thus is preferred to heat water for an estimated next user request.

Figure 3:
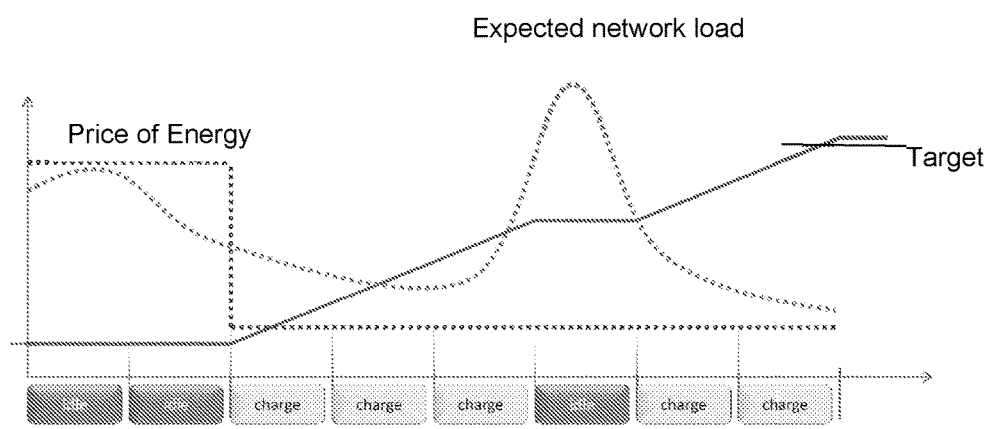
FIG. 3 is a schematic diagram representing how the method of the present invention controls the electric boiler to minimize the cost for the user and the load on the grid.

In this respect, FIG. 3 represents the scheduling of charges (power) of the boiler in a continued line wherein the power is suspended (horizontal portion of the line) when the price of energy and the load of the grid are height. The power is supplied to the boiler when load and price are low (rising portion), to save cost for the user and avoid overcharge on the grid.

Figure 4:
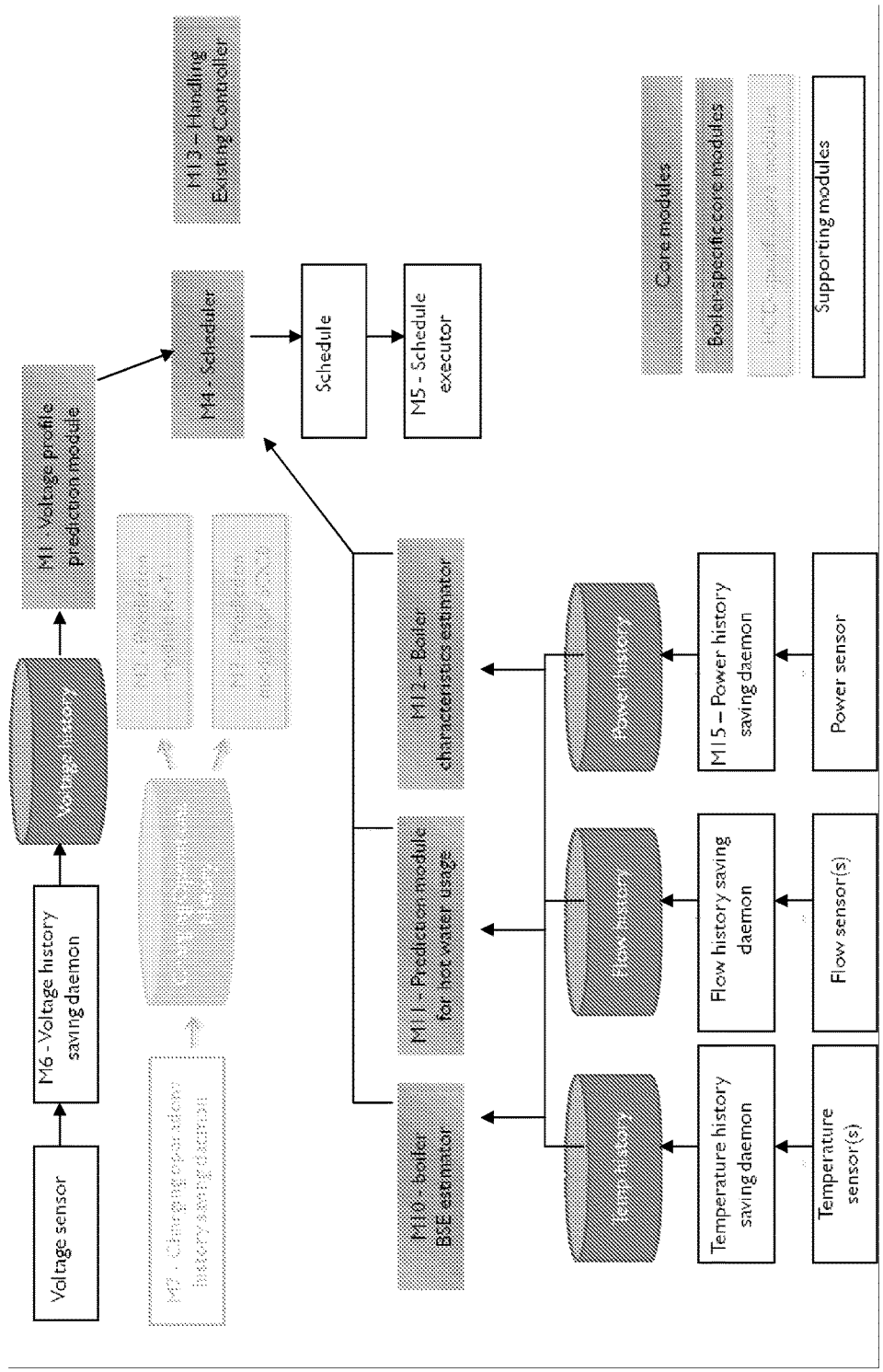
FIG. 4 represents logic blocks to implement the method according to the present invention, in an embodiment where temperature and flow sensors are available in the boiler.
Figure 5:
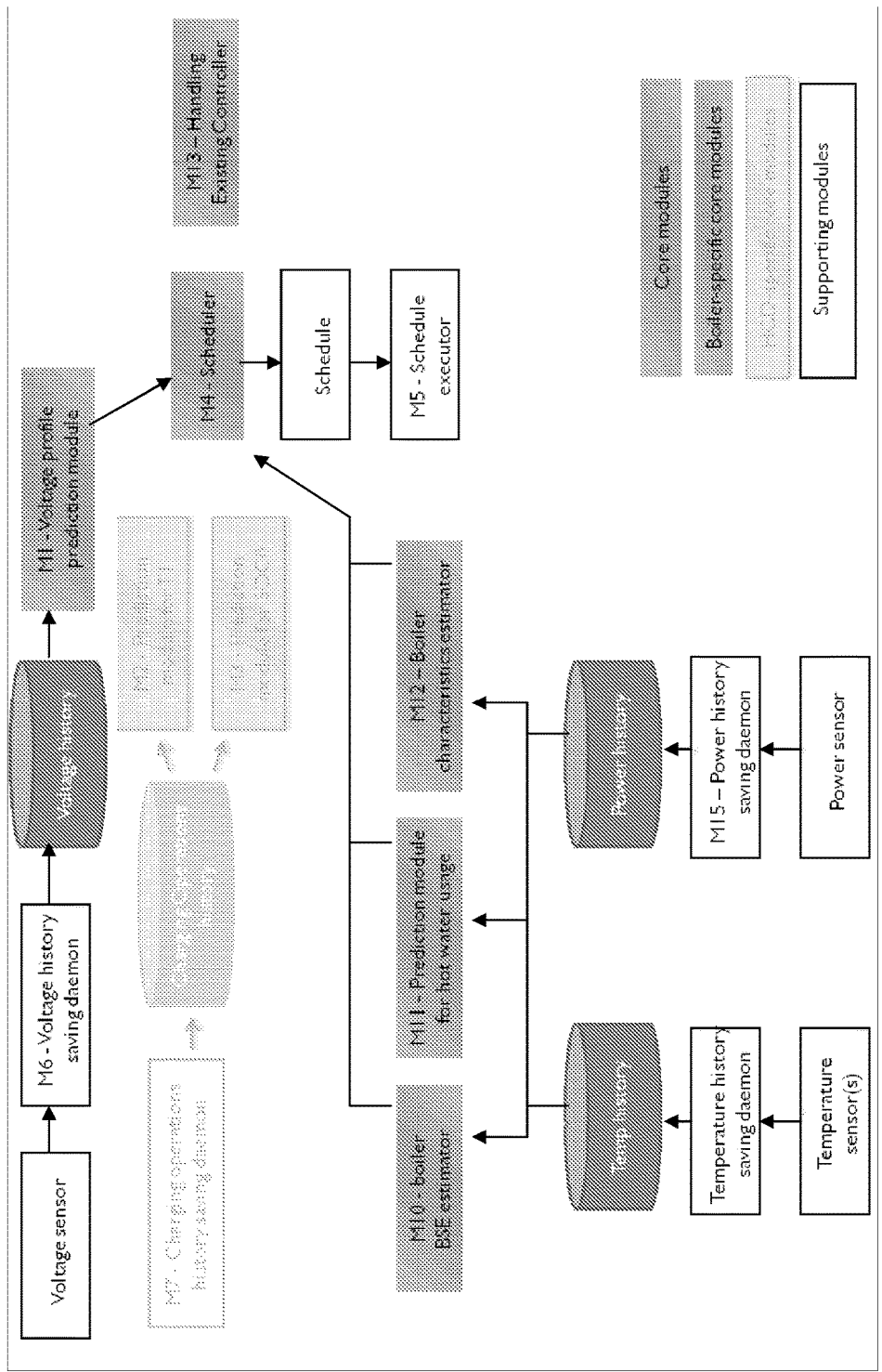
FIG. 5 represents logic blocks to implement the method according to the present invention, in another embodiment wherein temperature sensors are available in the boiler and no flow sensor is available.
Figure 6:
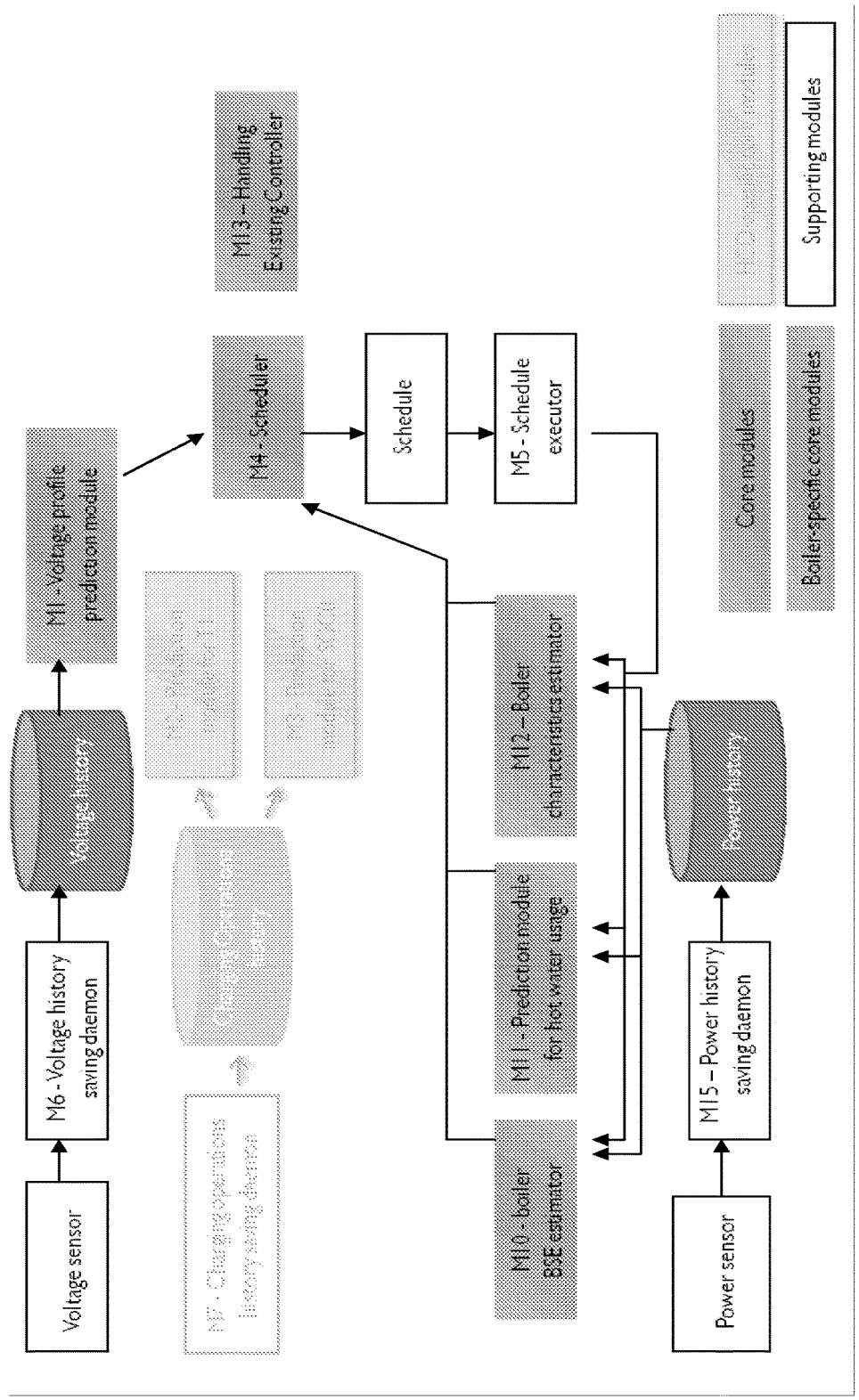
FIG. 6 represents logic blocks to implement the method according to the present invention, in a further embodiment wherein temperature sensors and flow sensors are not available in the boiler.

FIGS. 4-6, schematically represent in diagram blocks the modules for implementing the present invention with different boilers.

More particularly, FIG. 4 schematically represents how different modules interact in case the boiler is equipped with both temperature and flow sensors.

A module M10 (BSE estimation) takes inputs from power, temperature and flow sensors. Temperature sensors are the most relevant in this case but data from power and flow sensors is still used in order to improve the estimation: for example, heating elements turns on, the measurement from temperature sensors may not show any change for several minutes but, according to the method of the invention, an increasing amount of energy stored in the boiler is detected. A module M11 (Prediction module for hot water usage) takes inputs from flow sensors, which provide exactly the type of information needed. A module M12 (Boiler characteristics estimator) takes inputs from all sensors (as well as their historical values).

FIG. 5 schematically represents how different modules interact in case the boiler is equipped with only temperature sensors. In this case, the module M10 (BSE estimation) takes inputs from power and temperature sensors. Temperature sensors are the most relevant in this case but data from power sensors is still used in order to improve the estimation. Module M11 (Prediction module for hot water usage), in absence of a flow sensor, uses historical data from both temperature and power sensors in order to determine past flows, and therefore estimate flows in the future. In particular, in no-flow conditions the temperature loss due to thermal dispersion is predictable when boiler characteristics have been correctly estimated. Additional temperature losses will therefore be caused by hot water outflow, causing cold water to flow in and mix within the boiler tank. Module M2 (Boiler characteristics estimator) take inputs from power and temperature sensors, as well as their historical values.

FIG. 6 schematically represents how the different modules interact in case the boiler is not equipped with sensors. This embodiment is particularly advantageous for retrofitting scenarios. In this case, modules M10, M11 and M12 use the observed behaviour of the boiler when the pre-existing controller is in use (the pre-existing controller has a temperature sensor but temperature values are not readable because no communication is available with the boiler or controller). The method controls the boiler to be turned on or off For example, in a period of time [t0 t1] the method leaves the boiler powered on, which means that the pre-existing controller of the boiler is controlling the heating element. The pre-existing controller may turn on the heating element at time ta (ta>t0 and ta<t1) and turn off the heating element at time tb (tb>ta and tb<t1). The method of the invention observes ta and tb by measuring power usage and determine that the boiler BSE is minimum at ta and maximum at tb. This is important information to be used in module M10.

In addition, in the same scenario described above, the method can consider the time between ta and tb in order to estimate if and how much hot water was consumed in the same period. This is useful information for module M11. In fact, in absence of hot water consumption, the period between ta and tb will be roughly fixed. In case hot water is used, the period is shorter, because the energy stored in the boiler depletes faster, thus requiring an anticipated heating phase. The same information may be used from module M12 in order to estimate the physical characteristics of the boiler.

In this embodiment, the requirement to observe the behaviour of the pre-existing controller of the boiler implies that modules M10, M11 and M12 may occasionally act on module M5 (Schedule Executor), in order to force a desired state of the contact (for example, forcing the boiler to be powered on for a given period of time). Similarly, the modules M10, M11 and M12 need to know the current state of the contact, in order to correctly interpret the power measurement. In other words, the method needs to know whether a power reading of 0 is caused by the boiler being powered off or by the boiler being powered on but the heating being powered off due to the action of the pre-existing controller.

In this embodiment, module M10 (BSE estimation) takes inputs from the power sensor (in conjunction with the executed schedules from M5). Module M11 (Prediction module for hot water usage) takes inputs from the power sensor (in conjunction with the executed schedules from M5); module M12 (Boiler characteristics estimator) takes inputs from the power sensor (in conjunction with the executed schedules from M5).

Some of the advantages associated to the method and device according to the present invention is hereafter summarized. No temperature sensors or flow sensor are required aboard of the electric boiler to be controlled and no communication of information between the controlling device at the plug and the electric boiler are required. Thus, no adaptation is required to an already installed boiler.

Indeed, no devices other than the device at the plug is required. The user's usages are estimated and learnt measuring time and power outside the boiler, i.e. using a power sensor and measuring means in the device at the plug.

Advantageously, the method takes information from the fact that the boiler turns on periodically to avoid that temperature decreases under a threshold; this periodic activity requires a fixed time X of power consumption; when a time Y of power consumption is greater than X, the method provides identification of user's request of hot water, even if no flow sensors or temperature sensor are available in the boiler or in the interfaced device, to directly detect the hot water discharge. The detection are advantageously made outside the boiler and the phase of learning information on the user's usage of hot water (user request) is based on power absorption and time measured at the interface device.

At last, no network connection of the boiler or the device interfaced with it are required to avoid excessive loads on the grid, since the control of the load is based on local values of current measured at the plug.

The invention claimed is:

1. A method of heating water in an electrical boiler, comprising:
   storing user's requests of hot water in association with corresponding times of the requests;
   heating water in advance with respect to a next user's request, wherein the next user's request is estimated on the stored user's requests;
   detecting a start time of a power request from the electrical boiler to heat water;
   detecting a stop time of the power request;
   determining that a user's request of hot water has occurred if a time difference between the detected stop time and the detected start time is longer than a predetermined time, the predetermined time being a time of activation of the electrical boiler necessary to maintain a temperature of the water in the electrical boiler within a predetermined range in absence of a user's request;
   storing the determined user's request in association with a time of the user's request, the time of the user's request being a time between the detected start time and the detected stop time;
   estimating a next user's request based on the stored user's request; and
   activating the electrical boiler to heat water in advance with respect to the estimated next user's request.

2. The method according to claim 1, wherein the predetermined time of activation is determined selecting a plurality of time differences stored in the past which differ one from the other by less than a predetermined value and associating the predetermined time of activation to the selected plurality of time differences.

3. The method according to claim 2, wherein the predetermined time of activation is calculated as a medium value of the plurality of time differences stored in the past which differ one from the other by less than the predetermined value.

4. The method of claim 1, wherein the predetermined time of activation is used to estimate technical features of the electrical boiler, and wherein the technical features of the electrical boiler are configured to be stored and used to program the heating of water in advance with respect to the next user's request.

5. The method of claim 4, wherein the technical features of the electrical boiler are estimated comparing the predetermined time of activation with a plurality of reference activation times in which reference boilers with known technical features are capable to maintain the temperature of the water within the predetermined range, and wherein the technical features of the boiler are assumed to be correspondent to the technical features of the reference boiler having a reference activation time equal to the time difference.

6. The method of claim 4, wherein the technical features of the electrical boiler are estimated comparing the predetermined time with a plurality of reference activation times in which reference boilers with known technical features are capable to maintain the temperature of the water within the predetermined range, and wherein the technical features of the electrical boiler are assumed to be correspondent to more than one electrical boiler having respective reference activation times through a probability of correspondence with the more than one electrical boiler and wherein the probability of correspondence is used to program the heating in advance of water.

7. The method of claim 4, wherein the technical features are selected from thermal dispersion and capacity.

8. The method of claim 1, wherein the start time and stop time are used to estimate an energy E stored in the electrical boiler or a temperature T of the water in the electrical boiler at a time t within the start time and the stop time, wherein an energy Ea or temperature Ta at start time is estimated to be a minimum value of energy or temperature in the range Ea-Eb or Ta-Tb, where Eb is the energy at stop time and Tb is the temperature at stop time, and wherein the estimated values of energies E or temperatures T are stored and used to program the heating of water in advance with respect to the next user's request.

9. The method of claim 1, wherein the user's request is further associated to an energy absorption of the electrical boiler from a grid to satisfy the user's request at the time between start time and end time, and the energy absorption is stored in association with corresponding day and time t when energy is absorbed.

10. A device for heating water in an electrical boiler comprising:
at least one processor; and
at least one memory having instructions stored thereon, which when executed by the at least one processor cause the device to:
store user's requests of hot water in association with corresponding times of the requests;
program heating of water in advance with respect to a next user's request;
estimate the next user's request on the stored user's requests, wherein the programming takes in input of the user's requests and the estimations, and outputs commands to the electrical boiler; and
detect a start time of a power request from the electrical boiler and a stop time of the power request,
wherein the instructions further cause the device to determine that a user's request of hot water has occurred if a time difference between the detected start time and the detected stop time is longer than a predetermined time, the predetermined time representing a time of activation of the electrical boiler necessary to maintain a temperature of the water in the electrical boiler within a predetermined range in absence of a user's request,
wherein the instructions further cause the device to store the determined user's request in association with a time of the user's request, the time of the user's request being a time between the detected start time and the detected stop time,
wherein the instructions further cause the device to estimate a next user's request based on the stored user's request, and
wherein the electrical boiler is activated to heat water in advance with respect to the estimated next user's request.

11. The device of claim 10, further comprising an adaptor or interface to be plugged at a location selected from a household power socket, a mounting box, a cable connection, and a control panel, wherein the adaptor or interface is adapted to be connected to the electrical boiler, including an electrical boiler with no sensors.

12. The device of claim 10, wherein the instructions further cause the device to:
estimate technical features of the electrical boiler from the predetermined time of activation necessary to maintain the temperature of the water in the predetermined range, storage of the technical features, and
program taking in input of the technical features of the electrical boiler.

13. The device of claim 10, wherein the instructions further cause the device to:
estimate an energy stored E in the electrical boiler or a temperature T of the water in the electrical boiler at the start time and end time, wherein the estimating includes storage of estimated values of energy E or temperature T, and
program taking in input of the stored values of energy E or temperature T.

14. An electrical boiler comprising the device of claim 10.

15. The electrical boiler of claim 14, further comprising a heat pump to heat water.

16. The electrical boiler of claim 14, further comprising a temperature sensor, a flow sensor, and power sensors, wherein the instructions further cause the device to estimate energy takes in input values detected by the temperature, flow and power sensors.

* * * * *